Oct. 25, 1938.   J. C. NORDGRAN   2,134,313
AUTOMOBILE OR HIGHWAY SIGNAL
Filed March 6, 1937   3 Sheets-Sheet 1
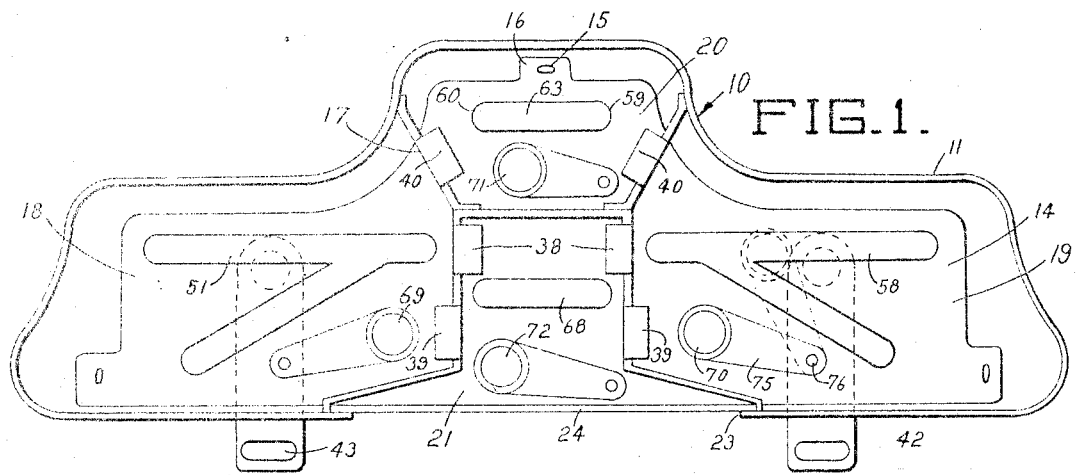
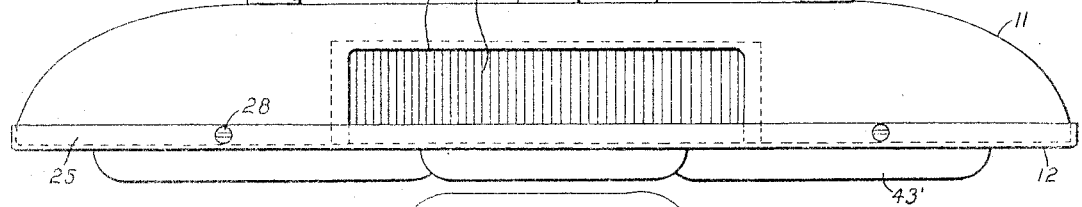
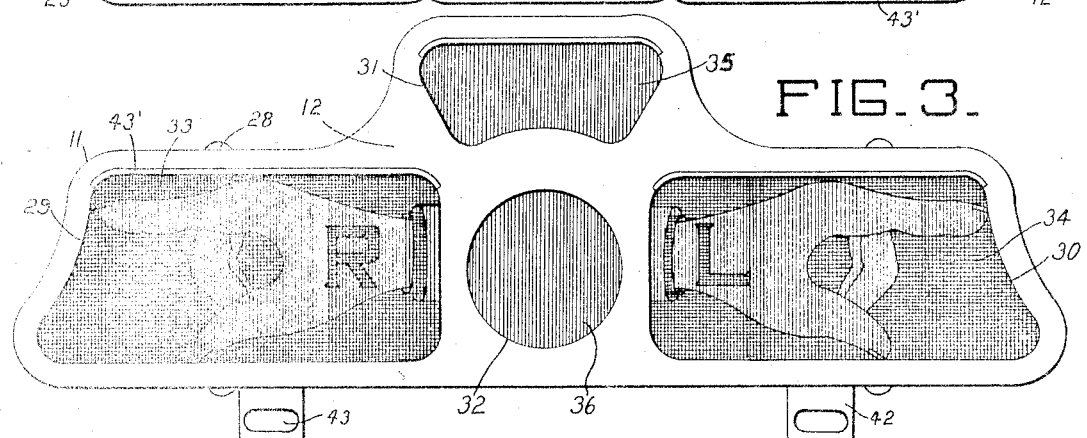
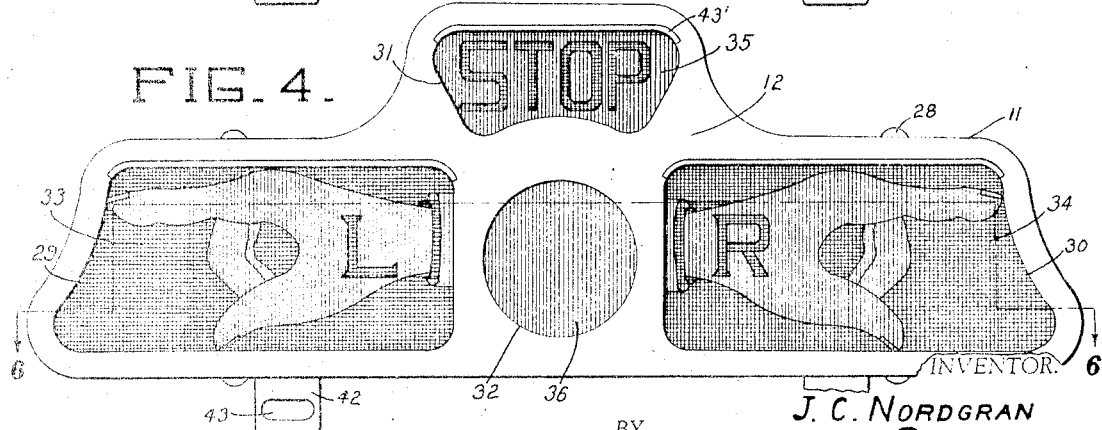
INVENTOR.
J. C. NORDGRAN
BY
ATTORNEY.

Oct. 25, 1938.　　　J. C. NORDGRAN　　　2,134,313
AUTOMOBILE OR HIGHWAY SIGNAL
Filed March 6, 1937　　　3 Sheets-Sheet 2
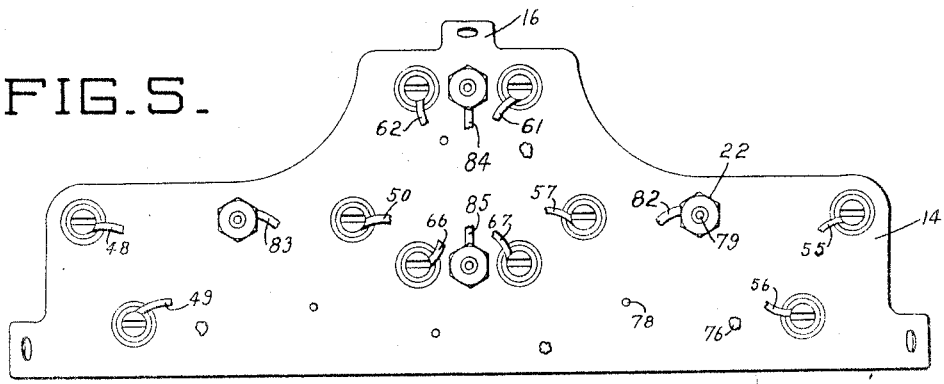
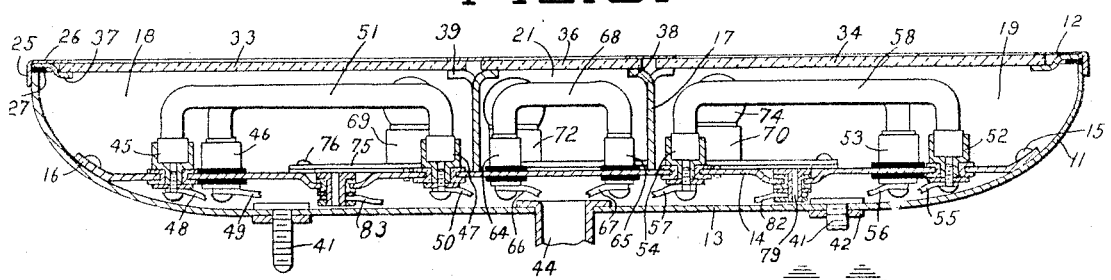
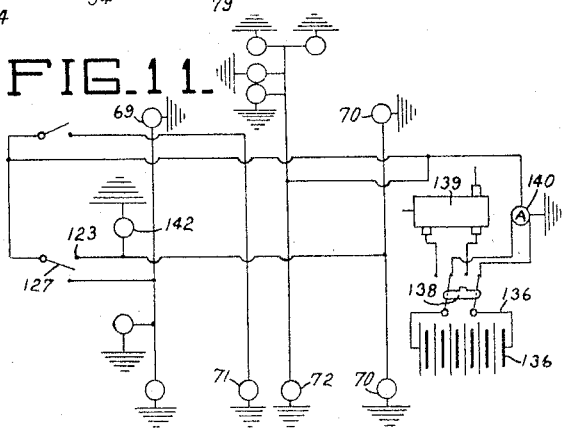
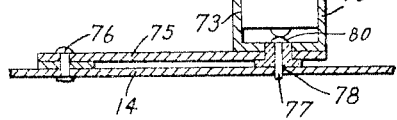
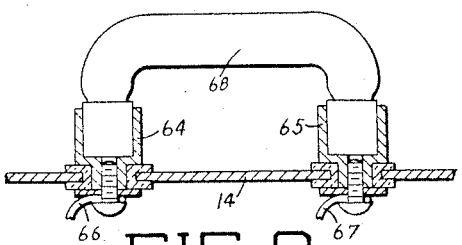
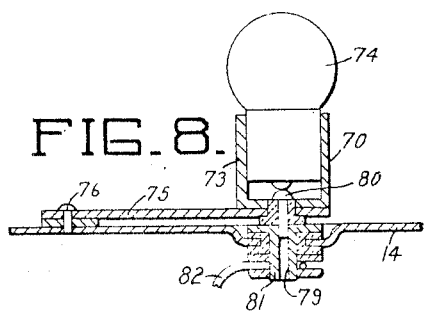
INVENTOR.
J. C. NORDGRAN
BY
ATTORNEY.

Oct. 25, 1938.                J. C. NORDGRAN                2,134,313
                        AUTOMOBILE OR HIGHWAY SIGNAL
                    Filed March 6, 1937        3 Sheets-Sheet 3
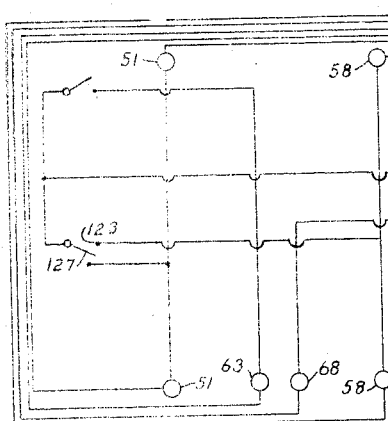
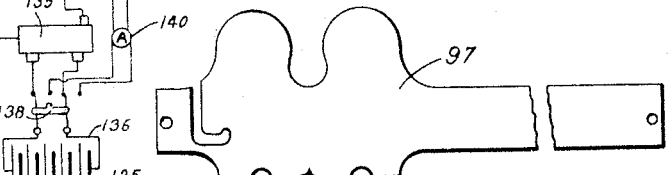
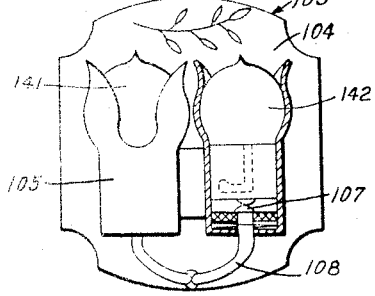
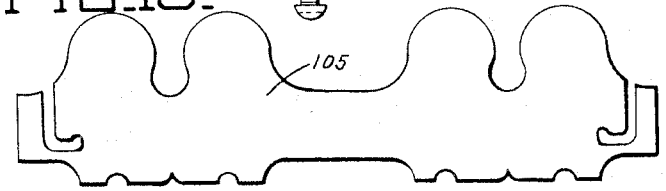
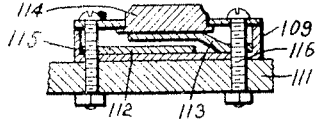
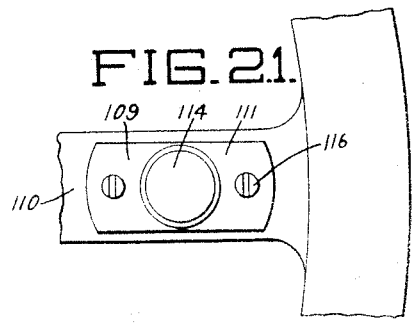
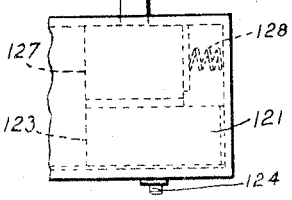
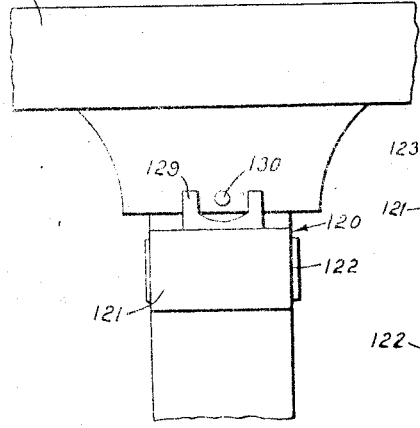
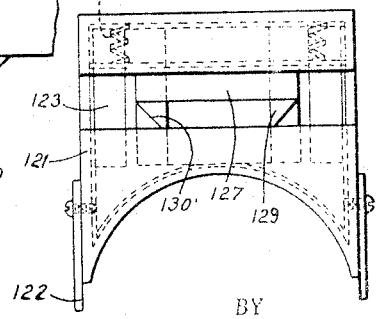
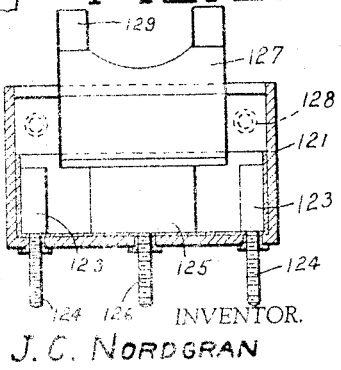
INVENTOR.
J. C. NORDGRAN
BY
ATTORNEY.

Patented Oct. 25, 1938

2,134,313

UNITED STATES PATENT OFFICE 2,134,313

AUTOMOBILE OR HIGHWAY SIGNAL

James C. Nordgran, Salt Lake City, Utah

Application March 6, 1937, Serial No. 129,421

2 Claims. (Cl. 177—327)

This invention relates to safety signals.

The general object of the invention is to provide a novel signal particularly adapted for use as an automobile signal for indicating a left or right turn and stop warning.

A more specific object of the invention is to provide a novel automobile safety signal including pilot lights to warn when apparatus is out of order.

Another object of the invention is to provide an automatic signal switch for operating my automobile safety signal.

Another object of my invention is to provide a novel signal adapted to be operated by either a neon tube or an incandescent bulb.

Other objects and the advantages of my invention will be apparent from the following description taken in connection with the accompanying drawings, wherein:

Fig. 1 is a front elevation of an improved safety signal embodying the features of my invention;

Fig. 2 is a top plan view of the safety signal;

Fig. 3 is a front elevation of the signal which is to be mounted on the front of the automobile;

Fig. 4 is a front elevation of the safety signal which is to be mounted on the rear of an automobile;

Fig. 5 is an elevation showing the base with its wiring attachments;

Fig. 6 is a section taken on line 6—6 Fig. 4;

Fig. 7 is a fragmentary section showing the pivotal mounting of the socket member;

Fig. 8 is a view similar to Fig. 7 showing the parts in another position;

Fig. 9 is a fragmentary central, sectional view through the socket members for holding a neon tube;

Fig. 10 is a view similar to Fig. 27 showing a slight modification of my invention;

Fig. 11 is a wiring diagram for the bulbs;

Fig. 12 is a wiring diagram for the neon tubes;

Fig. 13 is a fragmentary, top plan view of the pilot light mounted on the steering wheel;

Fig. 14 is a plan of the blank for making the pilot light socket and bracket;

Fig. 15 is a fragmentary, sectional view of a light mounting;

Fig. 16 is a side view of the light mounting;

Fig. 17 is a front elevation of the spring contact;

Fig. 18 is a front elevation of the dash board pilot lights;

Fig. 19 is a plan of the blank for making the two pilot light sockets;

Fig. 20 is a sectional view of the push button;

Fig. 21 is a fragmentary, top plan view of the steering wheel showing the push button;

Fig. 22 is a fragmentary, side elevation of the automatic switch and component parts;

Fig. 23 is a top plan view of the automatic switch;

Fig. 24 is a fragmentary, sectional side view of the automatic switch; and

Fig. 25 is a fragmentary side elevation showing the automatic switch.

Referring to the drawings by reference character I have shown my invention as embodied in a signal which is indicated generally at 10. As shown the signal comprises a housing 11 which may be made of sheet metal or other suitable material. The housing includes a front 12 and a back 13.

As shown the back 13 is cupped and includes a base 14 (Fig. 6) which extends thereacross and which may be secured in place by rivets 15 which pass through tongues 16. The base 14 is provided with a plurality of partitions 17 which form compartments 18, 19, 20 and 21.

The base is also provided with apertures through which contact members 22 extend and which will be presently described.

The back is provided with a lower aperture 23 over which a glass panel 24 is mounted to illuminate the license plate. The front 12 includes a peripheral band 25 and a front portion 26 with a sealing gasket 27 at the juncture of the portions. Suitable set screws 28 may be employed to hold the front 12 in place.

In the drawings I show the signal which is adapted to be placed on the front of the automobile in Fig. 3 and the signal which is adapted to be placed in the rear of the automobile in Fig. 4. The general configuration of the front and rear signals is the same but the indicia thereon is different.

Each of the fronts 12 is provided with apertures 29, 30, 31 and 32 which are disposed in front of the compartments 18, 19, 20 and 21 respectively. The apertures 29, 30, 31 and 32 receive glass panels 33, 34, 35 and 36 respectively.

The panels 33 and 34 are made of suitable colored glass or other semi-transparent material and include pointing hands with the letters R and L respectively thereon. The panel 36 included in the rear signal is a tail light and in the front constitutes a suitable colored light. In the panel 35 in the rear signal I provide the word "stop" while in the panel 35 in the front light may be suitably colored or otherwise provided as with the initials of the owner of the automobile.

The panels 33, 34, 35 and 36 are held at their edges by being engaged between a retaining flange 37 (see Fig. 6) and the overhanging portion of the front 12. The panels 35 are also held in place by spring tongues 38 on the edge of the partition member forming the upper partition while the inner edge of the panels 33 and 34 are engaged by similar spring tongues 39 on the partition member 17 and panels 36 are held in place by spring tongues 40 on the center partition members (see Fig. 1).

The back 13 is provided with screws 41 which hold brackets 42 in place. These brackets are provided with slots 43 through which suitable fastening means may be inserted for securing the signals in place. Suitable shields 43' may be secured above the panels.

The back is also provided with a conduit member 44 through which the leads to the lamps, presently to be described, may pass to the source of current.

The compartment 18 is provided with spaced socket members 45, 46 and 47 which are connected by wires 48, 49 and 50 respectively to a source of current. These socket members 45, 46 and 47 receive a V-shaped neon tube 51. In the compartment 19 I provide similar socket members 52, 53 and 54 which are connected by wires 55, 56 and 57 respectively with the source of current. In these socket members 55, 56 and 57 a neon tube 58 is mounted.

In the compartment 20 I provide a pair of socket members 59 and 60 which are connected by wires 61 and 62 with the source of current and which receive a neon tube 63.

In the compartment 21 I show socket members 64 and 65 which are connected by leads 66 and 67 with the current source and in which I provide a neon tube 68. The sockets 45, 46 and 47, etc., in which the neon tubes are mounted may be of any type by means of which the electrodes on the neon tubes may be placed in circuit with the source of electricity. Instead of the V-shaped neon tube I may use straight tubes in which case the sockets 46 and 53 will not be used.

Pivotally mounted in the compartments 18, 19, 20 and 21 I show socket members 69, 70, 71 and 72. These socket members are all identical and the description of one, for instance 70 as shown in Fig. 7, will suffice for all.

As shown the socket 69 includes a cylindrical member 73 in which an incandescent bulb 74 is mounted. The member 73 is mounted on an arm 75 which is pivoted as at 76 to the base 14. The terminal 77 of the tubular member 73 projects through an aperture 78 in the base and thus is held against moving.

The purpose of providing both neon tubes and incandescent bulbs in each compartment is to enable ready repair to be made in case one of the tubes should be broken when the driver of the vehicle is away from a source of supply of neon tubes. In this case he would merely remove the neon tubes and swing the arm 75 to the dotted line position in Fig. 1 in which position the pin 77 would pass into an aperture 79 in a contact member 80 mounted on the base 14. The pin 77 would thus make contact through a conducting member or tube 81 with a wire 82 which is connected to it.

The tube 81 in the compartment 19 is connected by a lead 83 with the source of power while the incandescent lamp bulb socket in the compartment 20 is connected by lead 84 with the source of power and the bulb socket in the compartment 21 is connected by a lead 85 with the power source.

In some cases I may provide a modified form of mounting for the neon tube and incandescent bulb as shown in Fig. 10 wherein the tube is indicated at 86 and is connected to the current source by leads which correspond with the leads 55, 56, and 57 previously described while the lamp socket tube 89 is mounted on an arm 90 which pivots on a post 91. The arm 90 extends above the neon tube 86 and the tubular member 89 is connected by the pin 92, conducting member 93, screw 94 with the lead 95 which corresponds to the lead 82 previously described.

In the use of my invention I prefer to provide a pair of pilot lights which are shown at 96 in Fig. 13 and which are mounted in a bracket 97 which may be made from the blank shown in Fig. 14 and which may be secured around a steering column 98 of an automobile.

In Figs. 15, 16 and 17 I show a modified form of lamp socket including a combined socket member 99 and securing bracket 100 with a contact member 101. The member 100 may be secured to suitable support while the contact member 101 may be secured in place by a screw 102.

In Fig. 18 I show a modified form of pilot light which is indicated generally at 103, and which includes a base 104 on which a pair of lamp socket members 105 are mounted. These members 105 may be made from the blank shown in Fig. 19 and the members are provided with contacts 107 which are connected by leads 108 with the source of power.

For illuminating the signal I may provide a push button 109 as shown in Figs. 20 and 21 which may be mounted on the steering wheel 110 and which includes a base 111 having one fixed contact 112 thereon and having a spring contact 113 and a push button 114 by means of which the contact may be brought together. Insulation 115 serves to space the contact normally apart and the parts are held together by means of screws 116.

In Figs. 22 to 25 inclusive I show an automatic safety signal switch which is indicated generally at 120. As shown this switch includes a housing 121 which is adapted to be secured by straps 122 to a steering wheel. The housing includes transversally extending contact members 123 which are connected to binding posts 124 and a central contact member 125 which is connected to a binding post 126.

A circuit closer 127 slides within the housing and is normally pressed against one side of the housing by springs 128. The circuit closer includes upwardly extending arms 129 which are adapted to be engaged by a pin 130 mounted on the steering wheel 110 of the vehicle. The construction is such that when the steering wheel is turned in one direction the pin 130 moves into engagement with one of the arms 129 thus moving the circuit closer in the direction in which the pin is moving and causing a circuit to be established from the contact 125 to one of the contacts 123. The arms 129 are bevelled as at 130' so that in case the steering wheel turns completely around the bevelled portions will allow this complete turning and will cam over the circuit closer 127 against the tension of the springs 128.

In Fig. 11 I show diagrammatically a form of wiring which may be employed in conjunction with the incandescent bulbs. It will be understood that these wiring systems are arranged side by side and in the drawings are shown as separate for the purpose of clearness.

The source of power is indicated as a battery 135 from which leads 136 extend to a two way switch 138 by means of which current may be directed either to the spark coil 139 for use with the neon tubes or through the ammeter 140 for use with the circuit to the incandescent bulbs. In each circuit a circuit closer 127 is employed which engages the contacts 123 to cause actuation of the signal.

The left hand signal lights, the right hand signal lights and the tail and stop lights are indicated by reference characters previously employed in connection with these elements while a pilot light for the left hand signal is indicated at 141 and a pilot light for the right hand signal is indicated at 142.

In the use of my invention the signal lights are installed on the vehicle and when the steering wheel is turned for a left hand turn the front and rear left signal lights will be illuminated to indicate such turn and when the wheel is turned to straight ahead position the signal will be extinguished.

In case the neon tube should be broken or otherwise the circuit to the neon tubes interrupted these tubes can be removed and the incandescent bulbs pivoted to the proper position after which the switch 138 can be shifted and the signal operation will be restored. With the modification shown in Fig. 10 it is not necessary to remove the neon tubes since incandescent bulb mounting passes over these tubes.

From the foregoing description it will be apparent that I have invented a novel safety signal which can be economically manufactured and which is highly efficient in use.

Having thus described my invention I claim:

1. In a safety signal, a housing including front, back, upper and lower portions, a partition member in said housing having its ends engaging the lower portion and extending upwardly to form a middle compartment, a pair of spaced partition members each engaging the first mentioned partition member and the upper portion of the housing to define a top and a pair of end compartments, said front portion having an overhanging peripheral portion and a retaining peripheral flange spaced therefrom, translucent closures for said compartments, said closures engaging between said overhanging portion, said retaining flange and said partitions.

2. In a safety signal, a housing including front, back, upper and lower portions, a partition member in said housing having its ends engaging the lower portion and extending upwardly to form a middle compartment, a pair of spaced partition members each engaging the first mentioned partition member and the upper portion of the housing to define a top and a pair of end compartments, said front portion having an overhanging peripheral portion and a retaining peripheral flange spaced therefrom, translucent closures for said compartments, said closures engaging between said overhanging portion and said retaining flange and spring fingers on said partitions engaging said closures to assist in holding them in place, certain of the spring fingers on said first mentioned partition extending in one direction therefrom and other of the opening fingers extending in an opposite direction therefrom.

JAMES C. NORDGRAN.